United States Patent [19]
Mollhagen

[11] Patent Number: 5,331,923
[45] Date of Patent: Jul. 26, 1994

[54] PORTABLE SQUEEZE CHUTE APPARATUS AND METHOD

[76] Inventor: Jon D. Mollhagen, Rt. 1, Box 63, Lorraine, Kans. 67459

[21] Appl. No.: 141,422

[22] Filed: Oct. 20, 1993

Related U.S. Application Data

[63] Continuation of Ser. No. 881,737, May 11, 1992, abandoned.

[51] Int. Cl.$^5$ .................. A01K 1/062; A61D 3/00
[52] U.S. Cl. .................. 119/734; 119/733; 119/729
[58] Field of Search .............. 119/731, 729, 730, 732, 119/734

[56] References Cited

U.S. PATENT DOCUMENTS

| | | | |
|---|---|---|---|
| 629,675 | 7/1899 | Fox . | |
| 2,279,840 | 4/1942 | Robinson et al. . | |
| 2,483,516 | 10/1949 | Babson . | |
| 2,593,597 | 4/1952 | Palmer . | |
| 2,692,577 | 10/1954 | Thomas . | |
| 2,713,326 | 7/1955 | Stephson | 119/99 |
| 2,714,367 | 8/1955 | Arnold . | |
| 2,730,072 | 1/1956 | Firkins | 119/99 |
| 2,786,449 | 3/1957 | Dahlerup . | |
| 2,935,965 | 5/1960 | Smith . | |
| 2,991,755 | 7/1961 | Ekren . | |
| 2,995,111 | 8/1961 | Darden . | |
| 3,051,127 | 8/1962 | Norbury . | |
| 3,099,249 | 7/1963 | Newhouse | 119/99 |
| 3,225,744 | 12/1965 | Procter . | |
| 3,237,603 | 3/1966 | Markegard | 119/99 |
| 3,370,835 | 2/1968 | Crowson . | |
| 3,631,839 | 1/1972 | Postigo . | |
| 3,683,864 | 8/1972 | Priefert | 119/99 |
| 3,796,191 | 3/1974 | McIntire . | |
| 3,894,515 | 7/1975 | Plyler . | |
| 3,929,104 | 12/1975 | Corbin . | |
| 4,027,629 | 6/1977 | Pearson | 119/99 |
| 4,034,716 | 7/1977 | Fleming | 119/82 |
| 4,201,157 | 5/1980 | Lambert | 119/82 |
| 4,201,158 | 5/1980 | Parker | 119/98 |
| 4,250,836 | 2/1981 | Smith | 119/20 |
| 4,302,908 | 12/1981 | Parker | 119/734 |
| 4,303,258 | 12/1981 | Davis | 119/14 |
| 4,321,889 | 3/1982 | Michaelsen et al. | 119/82 |
| 4,366,775 | 1/1983 | Tyquin | 119/20 |
| 4,432,305 | 2/1984 | Vernese | 119/98 |
| 4,452,178 | 6/1984 | Nijhuis | 119/20 |
| 4,499,856 | 2/1985 | Hecht et al. | 119/82 |
| 4,513,691 | 4/1985 | Wood | 119/99 |
| 4,566,404 | 1/1986 | Instone et al. | 119/8 |
| 4,617,876 | 10/1986 | Hayes | 119/155 |
| 4,630,570 | 12/1986 | Wilson et al. | 119/20 |
| 4,702,200 | 10/1987 | Simington | 119/99 |
| 4,829,936 | 5/1989 | Mollhagen | 119/20 |
| 4,947,800 | 8/1990 | Widney | 119/99 |
| 4,960,074 | 10/1990 | Wilson | 119/20 |
| 5,111,773 | 5/1992 | Akins | 119/99 |
| 5,138,981 | 8/1992 | Akins | 119/99 |
| 5,184,572 | 2/1993 | Meier | 119/733 |

*Primary Examiner*—John G. Weiss
*Attorney, Agent, or Firm*—Litman, McMahon & Brown

[57] ABSTRACT

An improved portable squeeze chute apparatus and method includes a chute having an entrance end, an exit end, opposing sidewalls, a base, and a superstructure. Each of the sidewalls has an openable upper panel and lower panel for accessing upper portions and lower portions, respectively, of an animal positioned in the chute. Each of the sidewalls is selectively pivotable about a plurality of generally horizontal axes in order to immobilize lateral movement of an animal positioned in the chute. An exit gate having a neck clamp, positioned at the exit end of the chute, has interconnected neck clamp side portions for selectively clamping the animal's neck. An entrance gate has interconnected entrance gate side portions for selectively preventing the animal from exiting rearwardly from the chute. Various portions of the apparatus are each controllable by a respective hydraulic piston and two-way valve arrangement. Special mountings are provided which are adapted to reduce noise generated by operation of the apparatus. Transducers of an electronic scale are sandwiched between the base and an substructure for weighing the animal positioned in the chute. A plurality of spacers protect the transducers as the apparatus is being transported.

39 Claims, 4 Drawing Sheets

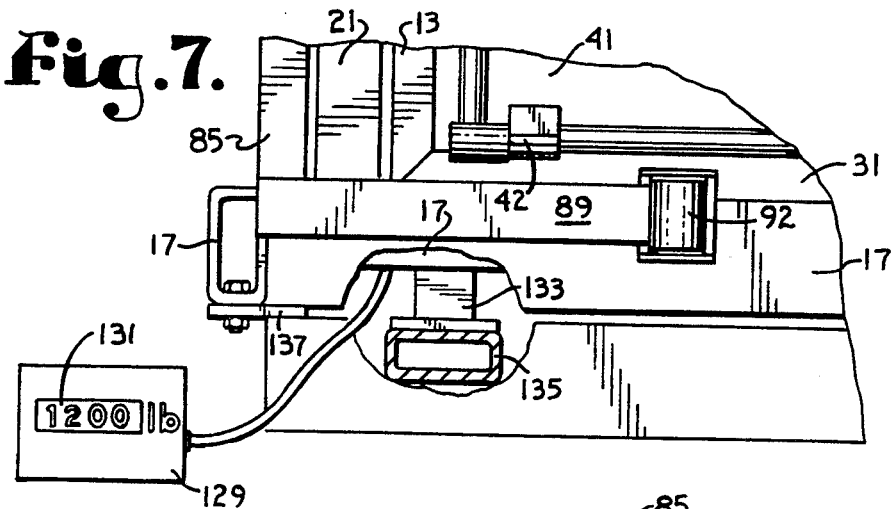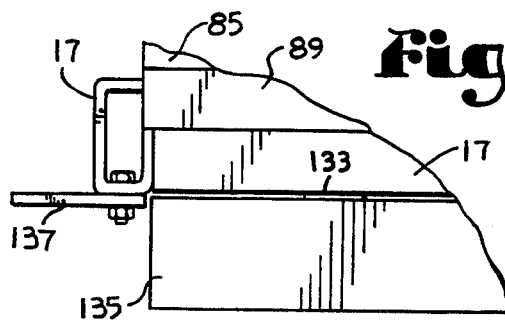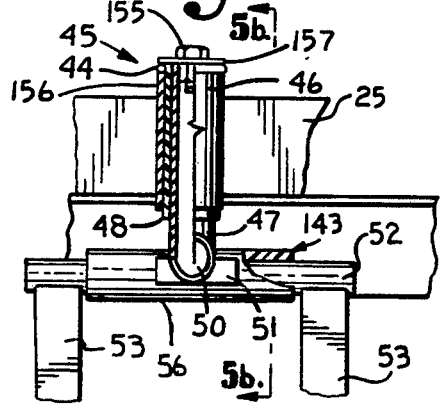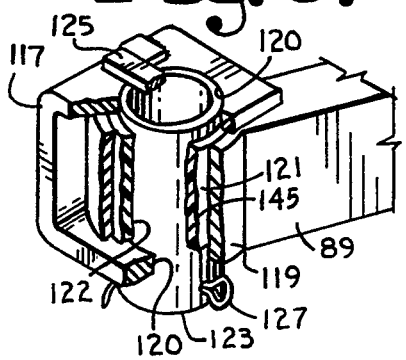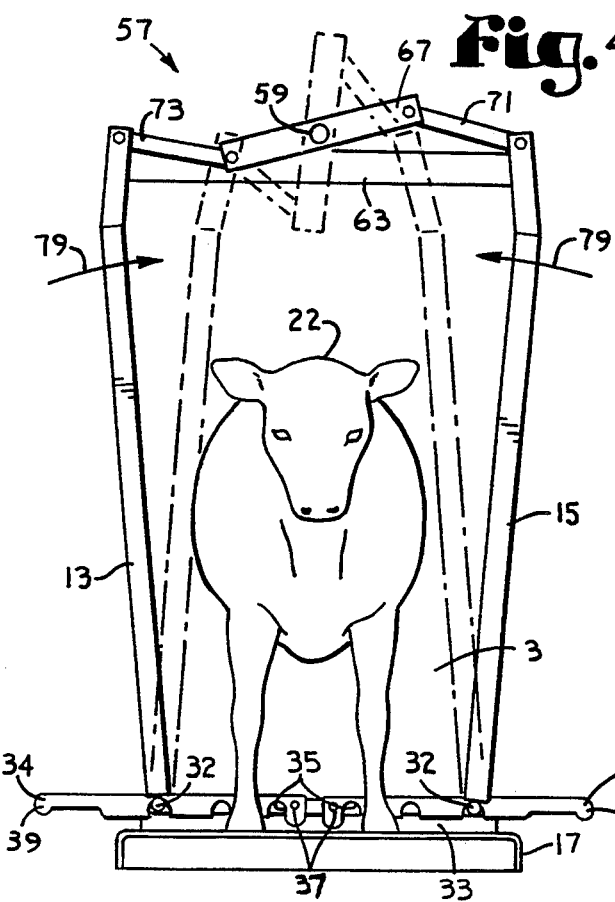

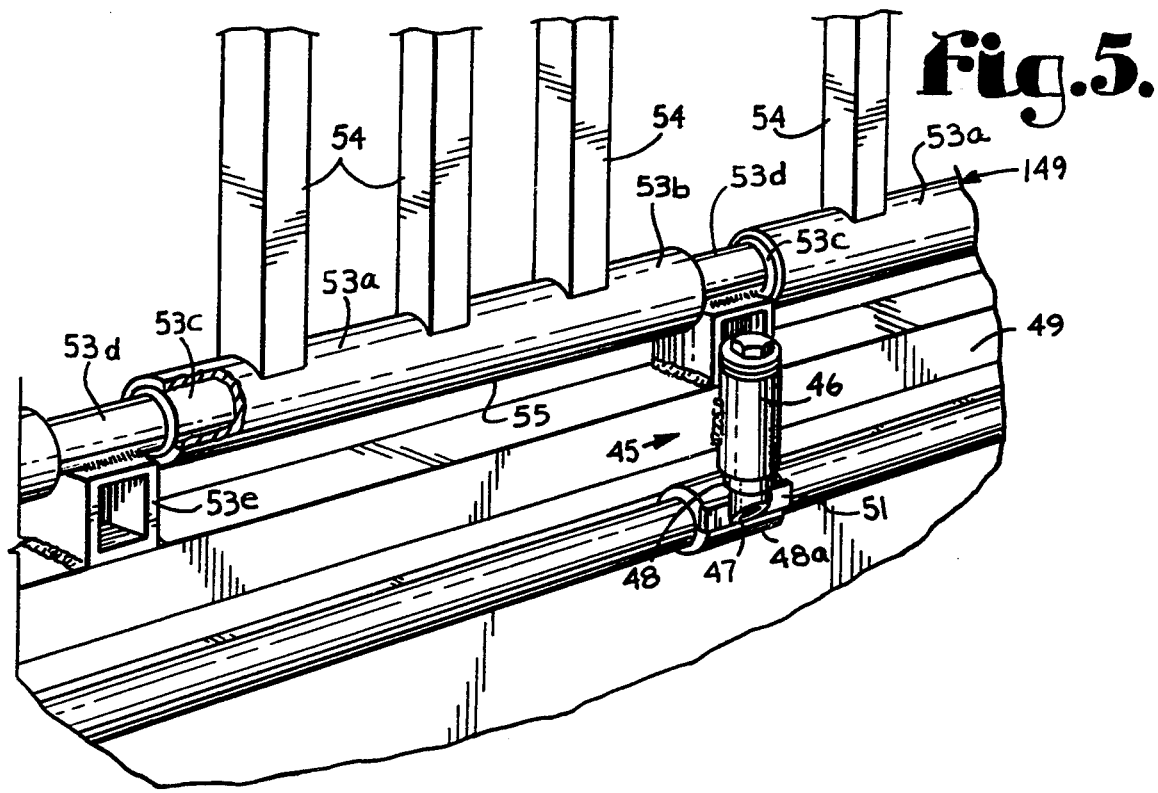

PORTABLE SQUEEZE CHUTE APPARATUS AND METHOD

This application is a continuation of Ser. No. 7/881,737 filed May 11, 1992, now abandoned.

BACKGROUND OF THE INVENTION

1. Field of the Invention

The present invention relates generally to animal husbandry, and in particular to a portable apparatus for use in connection with treating and weighing livestock.

2. Description of the Related Art

In livestock operations it is often necessary to restrain or direct the animals for palpating, immunizing, branding, treating, weighing, loading, etc. Corrals, loading chutes, alleyways, pens, and the like, have heretofore been constructed and employed by cow-calf operators, steer operators, and large animal veterinarians for these purposes. These structures are often constructed permanently of fence materials, such as stone, barbed wire, wood rails, steel pipe, and the like. However, the capital investment required for such permanent structures is often prohibitive to decentralized ranch operations, particularly those that run livestock on relatively small, isolated tracts of grazing land. Furthermore, many ranchers lease, rather than own, their grazing land and naturally wish to avoid making permanent, fixed improvements.

A common solution to this problem is to physically transport the animals to a location having the necessary permanent, fixed equipment. However, transporting a herd of large animals tends to be relatively time-consuming and expensive. For example, a round trip from a grazing pasture to a treatment area requires loading, transporting, and unloading the animals twice. Naturally, the time and expense associated with transporting livestock herds increases with the distances and the number of animals involved.

A solution to the aforementioned problems is to provide portable livestock working equipment. For example, my previous Letters Patent, U.S. Pat. No. 4,829,936, discloses a portable animal handling unit with retractable transport wheels. The unit provides animal holding passages and chutes for a variety of animal handling and working operations.

A disadvantage with many prior art portable animal handling devices is that large animals can be hazardous to workers trying to direct and control them with such equipment. Animals that are unaccustomed to confinement frequently balk at entering confining structures and may even panic. Also, after being restrained, an animal may spontaneously react by kicking, trying to climb up or back out, and the like. Many of the prior art animal working structures provide little or no protection from such hazards.

Squeeze chutes can be provided with hydraulic power systems for opening and closing their gates and for constricting and expanding their sidewalls to reduce or expand the size of the enclosure in which animals are received. Such hydraulic power systems have the advantage of permitting control of the operable components of the chute from a control station which can be equipped with lever-actuated hydraulic valves on one side of the chute. However, powered operations of many previous squeeze chutes tended to be relatively noisy. For example, noise levels of previous hydraulically-powered squeeze chutes could reach levels of approximately 100 decibels. Such noise levels can interfere with the safe and efficient operation of a squeeze chutes. Firstly, relatively loud noises tend to fatigue the operators, who often are subjected to such noise for many hours at close range during a normal working day. Secondly, the livestock being processed can be startled or panicked by strange, loud noises, such as those made by many previous squeeze chutes. Thirdly, operators can have difficulty communicating over such loud noises. Since commands must sometimes be given to initiate the operation of relatively heavy machinery, the ability of the operators to communicate can be an important safety consideration. Thus, excessively loud squeeze chutes tended to be somewhat unsafe and physically tiring to operate, while contributing to the difficulty in handling frightened animals.

Another problem with many previous squeeze chutes relates to the operation of their gates. Such gates often include pairs of panels which are pivotally mounted on the squeeze chute frame or superstructure in such a way that the gate panels generally traverse arcs which tend to swing the panels into the faces of the animals and thus contribute to their stress and sense of distress.

What is needed is an animal working apparatus that provides working accessibility to an animal confined therein while assuring relative safety and comfort for both the confined animal being worked and those working the animal.

SUMMARY OF THE INVENTION

An improved portable squeeze chute apparatus and method are provided for restraining a large animal while being worked, such as branding, vaccinating, artificially inseminating, de-horning, or the like. The apparatus includes a chute having opposing sidewalls, a base having a floor, and a superstructure. The sidewalls are connected to the superstructure such that each of the sidewalls is rotatable about an axis provided by a pair of generally horizontally oriented stub axles situated near the lower extremity thereof. Upper portions of the opposing sidewalls are interconnected such that they can be synchronously pivoted about their respective axes to selectively allow and prevent lateral movement of an animal positioned in the chute.

The synchronous pivoting of the opposing sidewalls is controlled by a sidewall hydraulic piston and two-way valve arrangement. A pair of fixing levers are adapted to selectively locate the stub axles of one of the opposing sidewalls at a plurality of locations to allow for restraining differently sized animals in the chute. Another pair of the fixing levers is similarly used for the other one of the opposing sidewalls.

Each of the opposing sidewalls has a lower panel which is pivotable about a lower extremity thereof to provide access to lower portions of an animal positioned in the chute. A lower panel latching mechanism selectively retains the lower panel in a closed configuration. The lower panels have planar inner surfaces to avoid providing footholds for an animal positioned in the chute.

Each of the opposing sidewalls also has an upper panel which is pivotable about a lower extremity thereof to provide access to upper portions of an animal positioned in the chute. An upper panel latching mechanism selectively retains the upper panel in a closed configuration. The upper panels generally comprise a plurality of vertically oriented, spaced apart bars such that persons working an animal positioned in the chute can stand outside and reach therebetween.

The improved portable squeeze chute apparatus also includes an exit gate having a neck clamp, which is adapted to selectively abut opposing sides of an animal's neck as the animal is positioned in the chute, at an exit end of the apparatus. The neck clamp has a pair of cooperating opposing exit gate or neck clamp side portions which are selectively openable to permit the animal positioned in the chute to exit therefrom.

The opposing neck clamp side portions are interconnected such that they synchronously pivot about respective, generally vertical axes. Opening and closing of the neck clamp is generally controlled by an exit gate hydraulic piston and two-way valve arrangement. Each of the neck clamp side portions is biased inwardly by a spring arrangement to expedite closure of the neck clamp and to minimize "chatter" of the neck clamp side portions as the apparatus is being transported.

An entrance gate, which is provided at the entrance end of the chute opposite from the neck clamp and the exit end of the chute, is adapted to selectively prevent an animal positioned in the chute from exiting rearwardly therefrom. The entrance gate has a pair of cooperating opposing entrance gate side portions which are interconnected such that they synchronously pivot about respective, generally vertical axes. Opening and closing of the entrance gate side portions is controlled by an entrance gate hydraulic piston and two-way valve arrangement.

Gate side portions generally lie in planes which extend transversely across respective ends of the chute in their closed positions. Swing arms extend therefrom to hinge locations which are located on vertical pivotal axes located intermediately between the entrance and exit openings of the chute. The gate side portions thus swing through arcs which, as they near their closed positions, are nearly transverse with respect to the squeeze chute.

Noise reduction mountings are provided between a plurality of the moving parts to minimize noise fatigue of the user. Each of these mountings generally consists of a nylon or polyethylene sleeve imposed between a hub at the end of a mounting arm and a pin inserted through a secured bracket encircling the hub or other suitable hinging arrangement.

The improved portable squeeze chute apparatus also includes a substructure and an electronic scale having transducers sandwiched between the base and the substructure such that an animal positioned in the chute can be weighed. A plurality of supports or spacers are provided, one at each corner of the superstructure, which are adapted to selectively support the base and thereby protect the transducers as the apparatus is being transported. As the apparatus is being prepared for uses which include weighing of an animal positioned therein, the spacers are rotated such that the superstructure is no longer supported thereby and the base bears downwardly upon the transducers for weighing purposes.

Principal Objects and Advantages of the Invention

Therefore, the principal objects and advantages of the present invention include: to provide a portable squeeze chute apparatus and method for working a relatively large animal; to provide such an apparatus which is portable; to provide such an apparatus and method which selectively immobilizes lateral movement of an animal positioned therein; to provide such an apparatus which selectively immobilizes fore-and-aft movement of an animal positioned therein; to provide such an apparatus with an improved gate hinge arrangement with pivotal axes located intermediately between end openings of the squeeze chute; to provide such an apparatus which tends to reduce operator fatigue and animal stress; to provide such an apparatus which tends to facilitate operator communications by providing a relatively low noise level in operation; to provide such an apparatus which selectively provides access to lower portions of an animal positioned therein; to provide such an apparatus which selectively provides access to upper portions of an animal positioned therein; to provide such an apparatus which includes hydraulically operated controls for immobilizing lateral and fore-and-aft movements of an animal positioned therein; to provide such an apparatus which includes noise reducing mountings; to provide such an apparatus which includes a scale for weighing an animal positioned therein; to provide such an apparatus which is adapted for use with other livestock working equipment; to provide such an apparatus which provides an operator with a relatively high degree of protection from an animal positioned therein; to provide such an apparatus which is relatively economical to manufacture, efficient in operation, capable of a long operating life, and particularly well adapted for the proposed usage thereof.

Other principal objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged, fragmentary, cross-sectional view of the portable squeeze chute apparatus, taken generally along line 2—2 in FIG. 2, showing the chute in an open configuration in solid lines and in a laterally restraining or squeezing configuration in phantom lines.

FIG. 5 is an enlarged and fragmentary, perspective view of a hinge for an upper panel and a latch for a lower panel of the squeeze chute apparatus.

FIG. 5a is a further enlarged and fragmentary, partially cross-sectional view of one of the latches of the portable squeeze chute apparatus.

FIG. 5b is a still further enlarged, side elevational and partially cross-sectional view of the latch of the portable squeeze chute apparatus, taken generally along line 5b—5b of FIG. 5a.

FIG. 6 is a further enlarged and fragmentary, partially cross-sectional view of a noise reducing mounting of the portable squeeze chute apparatus.

FIG. 7 is an enlarged and fragmentary view of the portable squeeze chute apparatus with portions cut away to reveal details thereof, showing a scale readout and a spacer in a transport configuration.

FIG. 8 is an enlarged and fragmentary view of the portable squeeze chute apparatus similar to that shown in FIG. 7 but showing the spacer in a weighing configuration.

DETAILED DESCRIPTION OF THE INVENTION

Figure 1:
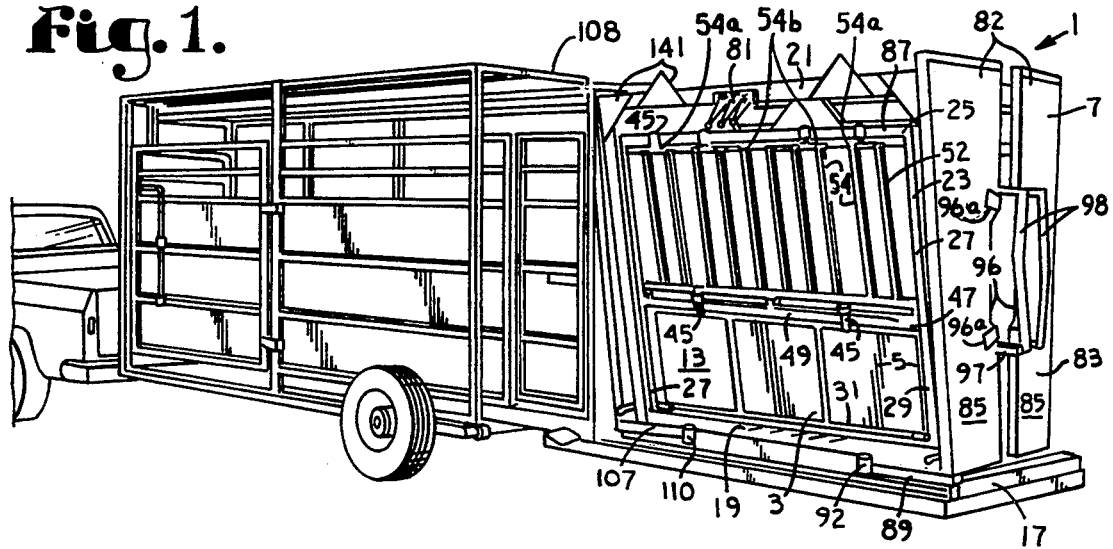
FIG. 1 is a perspective view of a portable squeeze chute apparatus, shown positioned on a platform extending rearwardly from a towed vehicle hitched to a pickup truck towing vehicle, according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a portable squeeze chute apparatus in accordance with the present invention, as shown in FIGS. 1 through 9. The apparatus 1 includes a chute 3, first or lateral immobilizing means 5, and second or fore-and-aft immobilizing means 7. The chute 3 generally has an exit end 9, an entrance end 11, opposing sidewalls 13 and 15, a base 17 having a floor 19, and a superstructure 21.

The lateral immobilizing means 5 is provided to selectively immobilize lateral movement of an animal 22 positioned in the chute 3. The fore-and-aft immobilizing means is provided to selectively immobilize fore-and-aft movement of the animal 22 as it is positioned in the chute 3.

Each of the opposing sidewalls 13 and 15 includes a frame 23 having a top rail 25, opposing side rails 27 and 29, and a generally horizontally oriented bottom rail 31. The bottom rail 31 of each of the sidewalls 13 and 15 is connected to the superstructure 21 such that each of the opposing sidewalls 13 and 15 pivots about an axis provided by a respective pair of generally horizontal stub axles 32. Each of the stub axles 32 rests atop one of a pair of generally horizontally oriented axle-supporting members 33 such that the bottom rails 31 are spaced above the floor 19 to protect workers standing alongside the apparatus 1 from sidewise kicking by the animal 22 positioned in the chute 3. The spacing of the bottom rails 31 above the floor 19 also facilitates cleaning of the floor 19 of the apparatus 1.

Figure 9:
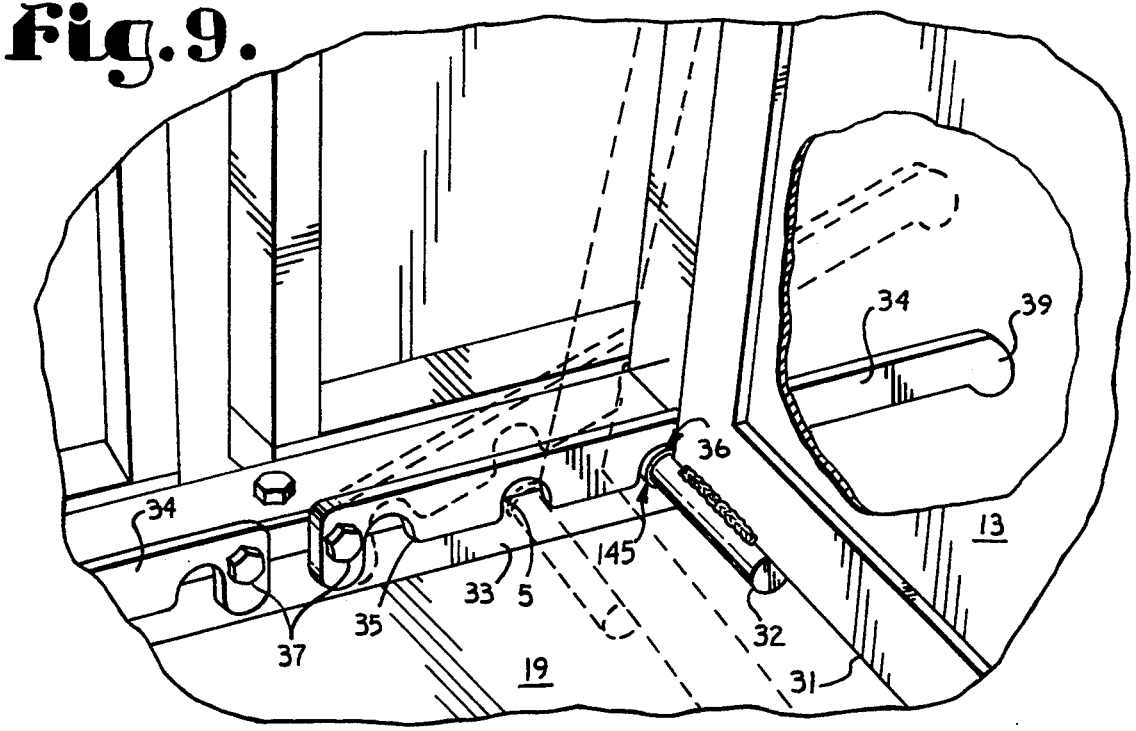
FIG. 9 is a further enlarged and fragmentary, perspective view of the portable squeeze chute apparatus showing a fixing lever in a locking configuration in solid lines and in an unlatched configuration in phantom lines, according to the present invention.

The apparatus 1 includes sidewall positioning or bottom rail spacing means, such as a pair of cooperating fixing levers 34, one pair for each of the bottom rails 31. Each of the fixing levers 34 has a plurality of notches 35 and is pivoted about a respective pivot pin 37, as shown in FIGS. 4 and 9. The levers 34 and the notches 35 are adapted such that as the levers 34 are spaced in their downwardmost configuration, a selected one of the notches 35 of each of the levers 34 encircles one of the stub axles 32, allowing the respective sidewall 13 or 15 to rotate about a generally horizontal, fore-and-aft axis.

By elevating distal ends 39 of a cooperating pair of the levers 33 such that lower extremities of appropriate ones of the notches 35 are elevated above the stub axles 32, as shown in FIG. 9, the stub axles 32 can be shifted inwardly or outwardly to mate with another selected set of the notches 35 of the cooperating set of levers 33 to establish a new center of rotation for the respective sidewall 13 or 15 and thereby adjust the chute 3 to accommodate a larger or smaller animal 22 positioned in the chute 3. Generally, each of the bottom rails 31 of the sidewalls 13 and 15 is similarly shifted to maintain the animal 22 near the fore-and-aft centerline of the chute 3.

Each of the sidewalls 13 and 15 includes first or lower access means, such as a lower panel 41, for accessing lower portions of the animal 22 positioned in the chute 3. Each of the lower panels 41 has a generally planar inner surface to prevent the animal 22 positioned in the chute 3 from using available surface irregularities as a ledge to attempt to climb out of the chute 3.

Figure 3A:
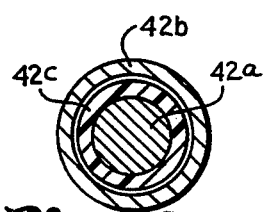
FIG. 3a is a further enlarged, cross-sectional view of a hinge mount of the portable squeeze chute apparatus, taken generally along line 3a—3a of FIG. 3.

Each of the lower panels 41 is generally connected to the respective bottom rail 31 by a plurality of hinge mounts 42, each having a pivot axle 42a and a hinge sleeve 42b, such that each of the lower panels 41 pivots about a respective, generally horizontal axis. Each of the hinge mounts 42 generally includes a hinge sleeve 42c disposed between the respective pivot axle 42a and the respective hinge sleeve 42b, as shown in FIG. 3a, such that noise is substantially reduced during operation of the apparatus 1.

Figure 5B:
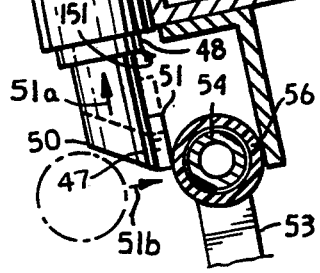

At least one latch 45 is adapted to selectively latch the respective lower panel 41 in a closed configuration, as shown in FIG. 5. Each of the latches 45 generally includes a casing 46, a pinion 47, and a latch sleeve 48. Each of the latches 45 for the lower panels 41 generally includes a latch roller 48a, constructed of nylon or polyethylene or other suitable material to facilitate latching of the lower panels 41 and to reduce noise during operation of the apparatus 1.

Each of the casings 46 is secured to a crossrail 49 of the respective sidewall 13 or 15. As the pinion 47 is fully inserted through the tubularly shaped casing 46, a distal end 50 thereof engages an upper extremity of the lower panel 41 to provide the latching function. A foot 51 can be secured to the distal end 50 to prevent inadvertent removal of the pinion 47 from the casing 46. The latch sleeve 48 is constructed of suitable material, such as nylon or polyethylene, and is disposed between the pinion 47 and the casing 46 for noise reducing purposes.

The distal end 50 is tapered such that latching is facilitated by urging the pinion 47 upwardly, as indicated by the arrow designated by the numeral 51a in FIG. 5a, as the respective lower panel 41 is closed, as indicated by the arrow designated by the numeral 51b.

Each of the sidewalls 13 and 15 also generally includes second or upper access means, such as an upper panel 52, for accessing upper portions of the animal 22 positioned in the chute 3. Each of the upper panels 52 has a plurality of generally vertically oriented bars 53, which are sufficiently spaced apart such that a worker can reach between adjacent pairs of the bars 53. Each of the upper panels 52 is connected to the respective crossrail 49 by upper panel mountings 53a, such that each of the upper panels 52 pivots about a respective, generally horizontal axis near the lower extremities thereof. The upper panel mountings 53a generally comprise a cylindrically shaped outer hinge member 53b, a cylindrically shaped intermediate hinge member 53c, and a cylindrically shaped inner hinge member 53d. The outer and inner hinge members 53b and 53d are generally constructed of steel or other suitable material, and the intermediate hinge member 53c is generally constructed of nylon or polyethylene or other suitable material to reduce noise during operation of the apparatus 1. Hinge spacers 53e are generally connected between the crossrail 49 and the inner hinge member 53d to provide spacing therebetween and to define locations for the outer and intermediate hinge members 53b and 53c along the inner hinge member 53d, as shown in FIG. 5.

For some applications, each of the upper panels 52 may comprise a plurality of sections 54 spaced edge-to-edge along each side of the animal 22 positioned in the chute 3. The sections 54 may have various widths, such as sections 54a and 54b as shown in FIG. 1. At least one of the latches 45 is secured to the top rail 25 for each of the sections 54 and is adapted to selectively latch the respective section 54 in a closed configuration. Each of the latches 45 for the upper panels 52 generally includes an upper panel latch roller 56, constructed of nylon or polyethylene or other suitable material, to facilitate latching of the upper panel sections 54 and to reduce noise during operation of the apparatus 1.

Figure 2:
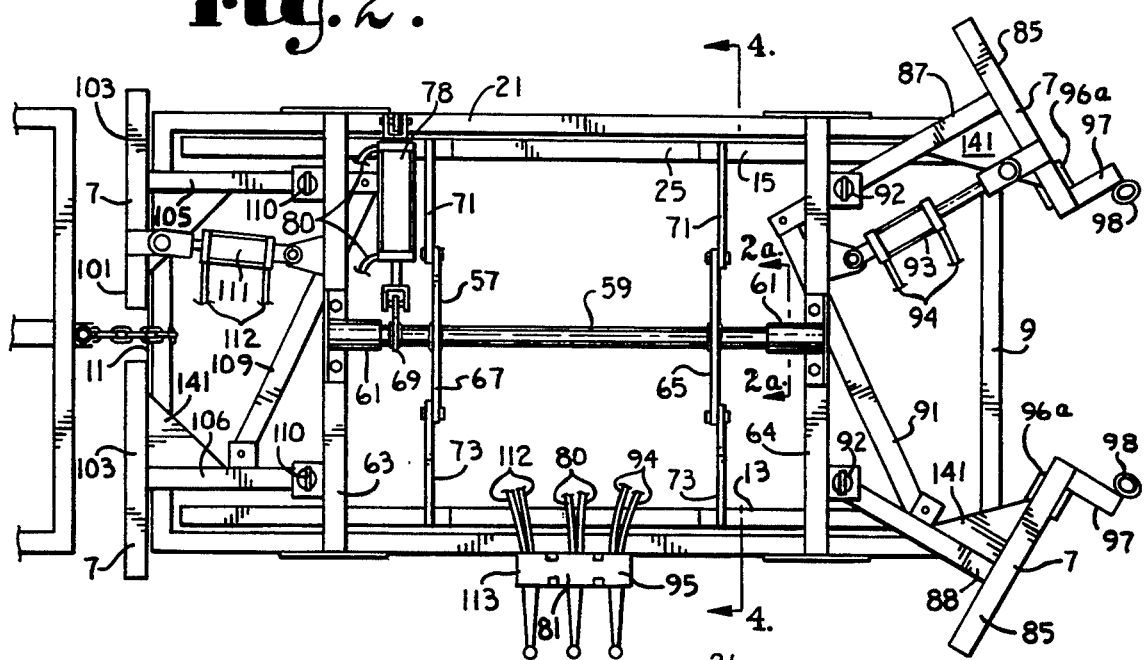
FIG. 2 is an enlarged and fragmentary, top plan view of chute of the portable squeeze chute apparatus, showing a neck clamp in an open configuration and an entrance gate in a closed configuration.
Figure 2A:
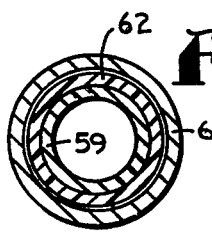
FIG. 2a is a further enlarged, cross-sectional view of a bracket of the portable squeeze chute apparatus, taken generally along line 2a—2a of FIG. 2.

First or sidewall interconnecting means, such as a flange and linkage mechanism 57 as shown in FIGS. 2 and 4, interconnect the sidewalls 13 and 15 such that the sidewalls 13 and 15 synchronously pivot about respective axes to selectively allow and prevent lateral movement of the animal 22 positioned in the chute 3. The mechanism 57 includes a rod 59 rotatably secured in a pair of opposing brackets 61, as shown in FIG. 2. Each of the brackets 61 is fixedly secured to a respective one of a pair of overhead crossbars 63 and 64 of the superstructure 21. Noise reducing sleeve bearings, constructed of an appropriate material such as polyethylene, are disposed between the rod 59 and respective ones of the brackets 61, as shown in FIG. 2a.

The linkage mechanism 57 also includes a pair of elongate linkage flanges 65 and 67 and a control flange 69. The control flange 69 and the linkage flanges 65 and 67 are fixedly secured to the rod 59 such that each extends radially outwardly from the rod 59. A pair of links 71 and 73 pivotally connect each of the flanges 65 and 67 to the top rails 25 of the sidewalls 13 and 15, as shown in FIG. 2.

First or sidewall control means, such as a hydraulically operated piston 78, is adapted to control the synchronous pivoting of the sidewalls 13 and 15. The hydraulic piston 78 has one end pivotally connected to the superstructure 21 and the other end pivotally connected to the control flange 69, as shown in FIG. 2. The mechanism 57 is adapted such that as the piston 78 is in an unextended or retracted configuration, the top rails 25 of the sidewalls 13 and 15 assume their outermost positions.

As the piston 78 extends to an extended configuration, the control flange 69 rotates the rod 59 which, in turn, rotates the linkage flanges 65 and 67, rotating the sidewalls 13 and 15 inwardly and thereby selectively immobilizing lateral movement of, or squeezing, the animal 22 positioned in the chute 3, as indicated by the arrows designated by the numeral 79 in FIG. 4. The piston 78 is connected by hydraulic hoses 80 to a two-way valve 81 such that extension and retraction of the piston 78 are controllable by a worker standing alongside the apparatus 1.

The fore-and-aft immobilizing means 7 generally include an exit gate 82 having a neck clamp 83 which is adapted to selectively abut opposing sides of the neck of the animal 22 as it is positioned in the chute 3. After working the animal 22, the exit gate 82 is selectively openable such that the animal 22 positioned in the chute 3 can exit forwardly from the chute 3. The neck clamp 83 generally includes two opposing neck clamp or exit gate side portions 85, each of which is connected to the superstructure 21 such that each of the exit gate side portions 85 pivots about a respective, generally vertical axis which is spaced intermediately between the exit end 9 and the entrance end 11.

Each of the exit gate side portions 85 is mounted by a respective upper arm 87, 88 and by a respective lower arm 89, such that as the exit gate side portions 85 are displaced from a closed configuration, as shown in FIG. 1, to an open configuration, as shown in FIG. 2, the exit gate side portions 85 swing clear of other components of the apparatus 1 as the exit gate side portions 85 are opened and swing transversely toward the animal 22 to avoid causing the animal 22 to panic as the exit gate side portions 85 are closed.

Second or exit gate interconnecting means, such as an exit gate cross arm 91, are pivotally connected to and interconnect the upper arms 87 and 88 such that the exit gate side portions 85 synchronously pivot about their respective mountings 92.

Second or exit gate control means, such as an hydraulic piston 93 is adapted to control the synchronous pivoting of the exit gate side portions 85. The hydraulic piston 93 has one end pivotally connected to the crossbar 64 and the other end pivotally connected to one of the exit gate side portions 85, as shown in FIG. 2, such that as the piston 93 is in an unextended or retracted configuration, the neck clamp 83 assumes a closed configuration, as shown in FIG. 1, and, as the piston 93 extends to an extended configuration, the neck clamp 83 assumes an open configuration, as shown in FIG. 2.

The piston 93 is connected by hydraulic hoses 94 to a two-way valve 95 such that opening and closing of the exit gate 82 is controllable by a worker standing alongside the apparatus 1.

The exit gate side portions 85 are profiled, as indicated by the numeral 96 in FIG. 1, such that the spacing therebetween in the closed configuration is sufficient to prevent pinching of the neck of the animal 22 as it extends therethrough. Cushions 96a may be appropriately spaced to cushion the neck of the animal 22 as needed. Each side of the neck clamp 83 comprises a pair of extenders 97 with an arcuately shaped bar or strap 98 therebetween for cradling the neck of the animal 22, thereby restricting the animal 22 from tossing its head to and fro or backing into the chute 3.

Each of the lower arms 89 is connected to a respective spring 99, which biases the respective exit gate side portion 85 toward a closed position to provide more rapid closure of the exit gate side portions 85 when restraining the animal 22 in the chute 3. The springs 99 also minimize "chatter" of the exit gate side portions 85 as the apparatus 1 is being transported.

The fore-and-aft immobilizing means 7, if used in a particular application, may include a rear closure or entrance gate 101, which is adapted to selectively prevent the animal 22 positioned in the chute 3 from exiting rearwardly from the chute 3. The entrance gate 101 generally includes two opposing second or entrance gate side portions 103, each of which is connected to the superstructure 21 such that each of the entrance gate side portions 103 pivots about a respective, generally vertical axis positioned intermediately of the chute ends 9, 11.

Similarly to the exit gate side portions 85, each of the entrance gate side portions 103 is mounted by an upper arm 105 or 106 and a lower arm 107, such that as the entrance gate side portions 103 are displaced from a closed configuration, as shown in FIG. 2, to an open configuration, the entrance gate side portions 103 swing clear of the other components of the apparatus 1 and of other handling equipment 108 spaced adjacent thereto.

Third or entrance gate interconnecting means, such as an entrance gate cross arm 109, are pivotally connected to and interconnect the upper arms 105 and 106 such that the entrance gate side portions 103 synchronously pivot about their respective mountings 110.

Third or entrance gate control means, such as an hydraulic piston 111 is adapted to control the synchronous pivoting of the entrance gate side portions 103. The hydraulic piston 111 has one end pivotally connected to the crossbar 63 and the other end pivotally connected to one of the entrance gate side portions 103, as shown in FIG. 2, such that as the piston 111 is in an unextended or retracted configuration, the entrance gate 101 assumes a closed configuration, as shown in FIG. 2, and, as the piston 111 extends to an extended configuration, the entrance gate 101 assumes an open configuration.

The piston 111 is connected by hydraulic hoses 112 to a two-way valve 113 such that opening and closing of the entrance gate 101 is controllable by a worker standing alongside the apparatus 1.

To minimize or eliminate noise fatigue of workers positioned near the apparatus 1, many of the connections, such as the mountings 92 and 110 for the exit gate 82 and for the entrance gate 101, respectively, are constructed substantially as hereinafter described. A mounting bracket 117 is secured to the superstructure 21 or other appropriate member of the apparatus 1. A pivoting member, such as the lower arm 89 of the exit gate 82, as shown in FIG. 6, comprises a cylindrically shaped hub 119 with a co-axially aligned pair of throughbores 120.

The hub 119 is axially hollow and contains a sleeve 121 constructed of nylon or other suitable material. The sleeve 121 has an axial throughbore 122, which is dimensioned substantially similar to the throughbore 120, to receive a mounting pin 123. The mounting pin 123 has a stop 125 which aligns the mounting pin 123 with the bracket 117 as the pin 123 is fully inserted through the throughbores 120. A retainer 127, such as a cotter key or other suitable device, is appropriately inserted through the mounting pin 123 beneath the bracket 117. Similar ones of the sleeves 121 may be imposed between the rod 59 and the brackets 61 to further reduce noise generation during use of the apparatus 1.

The apparatus 1 also includes weighing means, which generally comprise a commercially available electronic scale 129 with a readout monitor 131 and a plurality of appropriately spaced transducers 133. The transducers 133 are sandwiched between the base 17 and a substructure 135. A plurality of appropriately spaced supports or spacers 137 are pivotally secured to the base 17 such that as the spacers 137 are pivoted to a transport configuration, as shown in FIG. 7, the weight of the chute 3, etc., is substantially removed from the transducers 133 as the apparatus 1 is being transported.

As the apparatus is being used to work the animals 22, the spacers 137 are pivoted to a weighing configuration, as shown in FIG. 8, such that the weight of the chute, etc., is substantially supported only by the transducers 133. As a result, the weight of the animal 22 in the chute 3 can be determined by comparing the total weight with and without the animal 22.

Gussets 141 are provided as needed for strengthening the apparatus 1.

Figure 10:
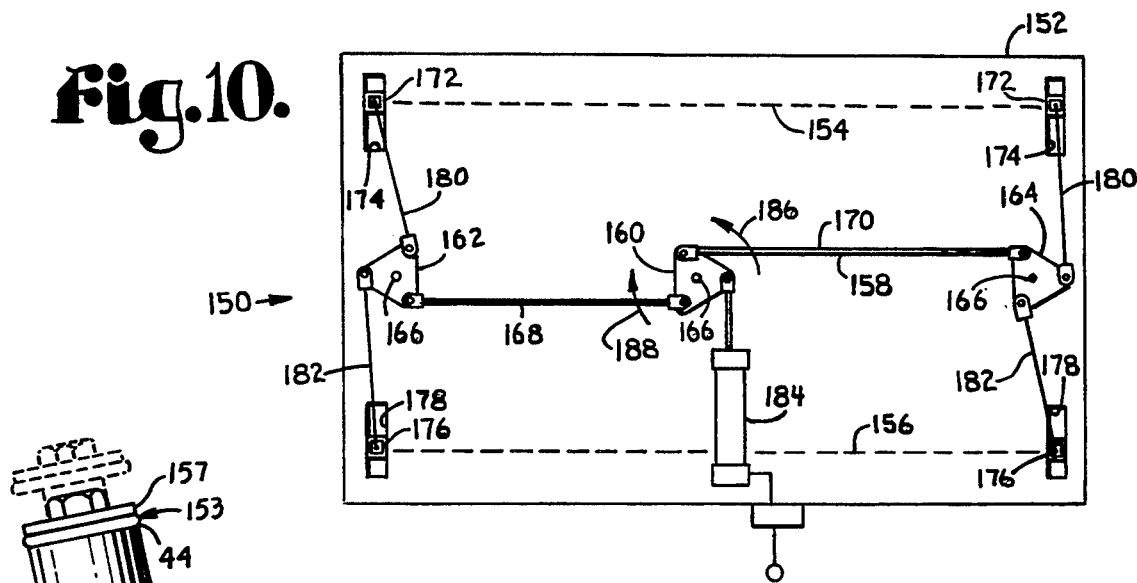
FIG. 10 is a bottom plan view of a portable squeeze chute comprising a first modified or alternative embodiment of the present invention, particularly showing a sidewall positioning system for adjusting the width of an exposed floor portion of the squeeze chute.

A portable squeeze chute apparatus comprising a first modified or alternative embodiment in accordance with the present invention is schematically shown in FIG. 10 and is generally designated by the reference numeral 150. Many of the characteristics of the modified portable squeeze chute apparatus 150 are substantially similar to those previously described for the portable squeeze chute apparatus 1 and are not reiterated here in detail.

FIG. 10 is a schematic bottom plan view of a floor 152 of the modified portable squeeze chute apparatus 150, with bottom edges of a pair of sidewalls shown by dashed lines as indicated by the numerals 154 and 156. The apparatus 150 includes bottom rail spacing or sidewall positioning means 158 for adjusting the width of an upper surface (not shown) of the floor 152 which is exposed between the sidewalls 154 and 156.

The sidewall positioning means 158 generally includes a control cam 160 and a pair of slave cams 162 and 164. Each of the cams 160, 162 and 164 is pivotally connected to the floor 152 about a respective axle 166 such that each of the cams 160, 162 and 164 rotates about a respective, generally vertically oriented axis. The control cam 160 is pivotally connected to each of the slave cams 162 and 164 by a pair of control rods 168 and 170, as shown in FIG. 10.

The sidewall 154 has a pair of wall extensions 172 extending downwardly through a mated pair of slots 174. Similarly, the sidewall 156 has a pair of wall extensions 176 extending downwardly through another mated pair of slots 178. A pair of slave rods 180 pivotally connect the wall extensions 172 to a respective one of the slave cams 162 and 164. Similarly, another pair of slave rods 182 pivotally connect the wall extensions 176 to a respective one of the slave cams 162 and 164.

Sidewall control means, such as a hydraulically operated piston 184 pivotally connected to the control cam 160 as shown in FIG. 10, is adapted to control synchronous pivoting of the sidewalls 154 and 156. As the piston 184 is extended, the control cam 160 is caused to rotate in a counterclockwise direction, as indicated by the arrow designated by the numeral 186. As the control cam 160 so rotates, the control rods 168 and 170 cause the slave cams 162 and 164 to rotate in a counterclockwise direction. As the slave cams 162 and 164 so rotate, the slave rods 180 and 182 cause the respective wall extensions 172 and 176 to be slidably displaced outwardly in the respective slots 174 and 178 such that the sidewalls 154 and 156 are also displaced outwardly, thereby exposing a wider portion of the (unshown) upper surface of the floor 152 between the sidewalls 154 and 156.

Similarly, as the piston 184 is retracted, the control cam 160 is caused to rotate in a clockwise direction, as indicated by the arrow designated by the numeral 188. As the control cam 160 so rotates, the control rods 168 and 170 cause the slave cams 162 and 164 to rotate in a clockwise direction. As the slave cams 162 and 164 so rotate, the slave rods 180 and 182 cause the respective wall extensions 172 and 176 to be slidably displaced inwardly in the respective slots 174 and 178 such that the sidewalls 154 and 156 are also displaced inwardly, thereby exposing a narrower portion of the (unshown) upper surface of the floor 152 between the sidewalls 154 and 156.

Noise Suppression System 143

The squeeze chute 3 includes a noise suppression system 143, which includes a sleeve-pivot subsystem 145 for suppressing noise at various pivotal connections between the chute components.

More specifically, the rod 59 and the brackets 61 of the flange and linkage mechanism 57 are separated by noise-reducing sleeve bearings 62. The sleeve bearings 62 can comprise a suitable material for reducing noise and friction, such as polyethylene, nylon or any other suitable material.

The sleeve-pivot subsystem is also located at the pivotal connections between lower ends 55 of the upper drop panel 52 and the sidewall crossrails 49, as shown in FIG. 5. Such pivotal connections include inner hinge members or axles 53d which are mounted on the crossrails 49 by spacers 53e. Outer, metal hinge members or sleeves 53b extend between respective pairs of spacers 53e, and bearing sleeves or intermediate hinge members 53c are positioned between the outer, metal sleeves 53b and the axles 53d for permitting relatively quiet and low-friction rotation therebetween. The intermediate, bearing sleeves 53c can comprise polyethylene, nylon or some other suitable material, and can extend substantially coextensively with the outer metal sleeves 53a between respective pairs of spacers 53a.

As noted above, the lower drop panels 41 are pivotally connected to respective bottom rails 31 by hinge mounts 42, each having a pivot axle 42a and a hinge sleeve 42b, such that each of the lower drop panels 41 pivots about a respective, generally horizontal axis. Hinge sleeves 42c, which can comprise polyethylene, nylon or other suitable material, are located between respective pivot axles 42a and hinge sleeves 42b, as shown in FIG. 3a.

Each stub axle 32 receives a respective stub axle sleeve 36 for reducing or suppressing noise and friction, as shown in FIG. 9.

Figure 3:
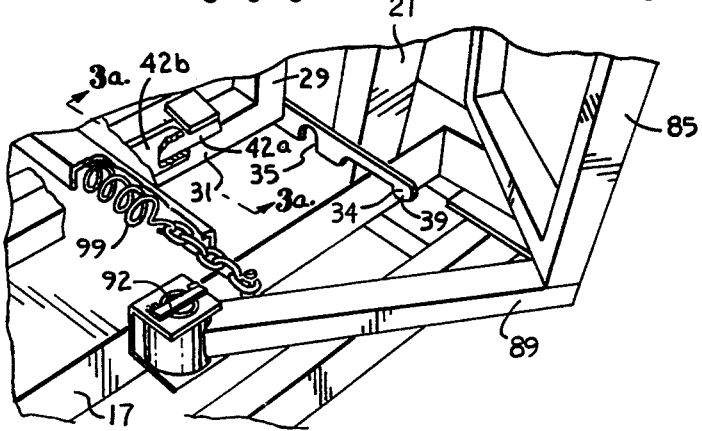
FIG. 3 is a further enlarged, perspective, fragmentary view of a spring return and a noise reducing mounting of a neck clamp side portion of the portable squeeze chute apparatus.

As shown in FIGS. 2 and 3, the mountings 92 for the arms 87, 88 and 89 also include noise-suppressing, antifriction hinges 147, each comprising a mounting pin 123 rotatably received within a bearing sleeve 121, which is in turn rotatably received within a hub 119 mounted on the respective arm 87, 88 or 89.

A second noise suppression subsystem comprises a plurality of captured latch roller assemblies 149, each located at a respective drop panel 41 or 52.

As shown in FIGS. 5 and 5a, each captured latch roller assembly 149 has a closed position wherein the latch roller 56 or 56a is captured and retained between a respective latch assembly 45 and the sidewall frame top rail 25 or the crossrail 49. The upper ends of the drop panels 41 and 52 are thus restrained by capturing the plastic sleeves or latch rollers 56 and 56a between the respective latches 45 and the sidewall frame top rail 25 and the crossrail 49. Thus, metal-on-metal contact in these locations is prevented and noise is suppressed when the upper panels 52 and the lower panels 41 are closed. Moreover, with the panels 41, 52 in their closed positions, the latch rollers 56, 56a function to suppress chatter at the secured upper ends of the panels 41, 52. If not silenced in this manner, such connections could be a source of considerable noise or chatter, i.e., as the animals in the chute 3 move about and as the sidewalls 13, 15 are manipulated.

The noise suppression system 143 further includes a latch sleeve subsystem 151 which comprises multiple latch sleeves 48, each located within a respective latch casing 46 and receiving a respective latch pinion 47 which is axially slidable therein along a generally vertical axis. The latches 45 are thus considerably quieter in operation because metal-on-metal contact is avoided by the interposition latch sleeves 48 so that latching and unlatching procedures involve metal-on-plastic contact only, which can be relatively quiet. Moreover, the latch sleeves 48 also cushion the latch casing and pinions 46, 47 from contact when subjected to lateral forces, for example forces which are transmitted through the drop panels 41, 52 and into the latch assemblies 45. Absent such latch sleeves 48, the noise level associated with such lateral forces could be considerable.

Still further, the noise suppression system 143 includes a latch O-ring subsystem 153 comprising a plurality of O-rings 44 each mounted on top of a respective latch pinion 47 by a bolt 155 threadably received in a nut 156 mounted within the respective pinion 47 and clamping the O-ring 44 in place by means of a washer 157. The O-ring subsystem 153 suppresses noise as the latches 45 open and close by cushioning the tops of the casings 46 and the respective pinions 47. Moreover, the O-rings 46 tend to suppress chatter which might otherwise be caused by relative movement between the washer 157, casing 46 and pinion 47 of each latch 45.

Collectively, the use of noise-abating tubing and O-rings as described above and as depicted herein can be employed at approximately sixty locations for avoiding metal-to-metal contact thereat and suppressing noise. More or fewer such connections could be equipped with such plastic sleeves and O-rings in chutes with different configurations embodying the present invention.

The cumulative effect of the noise suppression system 143 is to considerably suppress the operating noise, which can range from relatively low-amplitude "chatter" or background noise to relatively loud impact noises in chutes which are not equipped with such noise suppression systems. Stress on the animals and operators alike can be reduced by reducing the operating noises of all types. For example, even the relatively low-amplitude background noises or "chatter" can contribute to stress, fatigue and the like. The sudden, high-amplitude noises, such as those that might occur when the drop panels 41, 52 are slammed shut, can startle the animals and significantly increase their anxiety. Moreover, as frightened animals tend to struggle, they can further contribute to the noise levels by shaking the entire chute and exacerbate the stress-related problems which can accompany a squeeze chute lacking such a noise-suppression system.

The noise suppression system 143 is particularly important for livestock handling systems which are typically constructed with a certain amount of clay or with relatively loose tolerance at their connections. Such tolerances tend to reduce manufacturing costs and also tend to make such units better adapted for operation under the types of adverse conditions which are likely to be encountered in the field. Although a portable squeeze chute apparatus and method embodying and employing the present invention would be feasible with relatively tight tolerances and might even be preferable in some respects, the noise suppression system 143 is particularly well adapted for applications involving relatively loose tolerances which can withstand the relatively severe and adverse operating conditions which can be often be encountered in livestock handling operations.

The portable squeeze chute apparatus and method of the present invention are adaptable for use with animals of various sizes, including be not limited to bovine, equine, swine and bovine and other livestock.

It is to be understood that while certain forms of the present invention have been illustrated and described herein, it is not to be limited to the specific forms or arrangement of parts described and shown.

It is to be understood that while certain forms of the present invention have been illustrated and described herein, it is not to be limited to the specific forms or arrangement of parts described and shown.

I claim:

1. A livestock working apparatus, including:
   (a) a chute having an entrance end, an exit end, opposing sidewalls, a base having a floor, and a superstructure;
   (b) lateral immobilizing means for selectively immobilizing lateral movement of the livestock, said lateral immobilizing means associated with said opposing sidewalls;
   (c) exit gate means associated with said exit end, said exit gate means including fore-and-aft immobilizing means for selectively immobilizing fore-and-aft movement of the animal relative to the apparatus; and
   (d) said exit gate means is pivoted intermediately between said exit end and said entrance end such that said exit gate closes generally transversely to said chute.

2. The apparatus according to claim 1, including:
   (a) said lateral immobilizing means having sidewall interconnecting means for interconnecting said opposing sidewalls such that said opposing sidewalls synchronously pivot between open and closed positions.

3. The apparatus according to claim 1, including:
   (a) said fore-and-aft immobilizing means having an exit gate comprising exit gate side portions, each connected to said superstructure and pivotable about a respective generally vertical axis;
   (b) said exit gate includes neck clamp means adapted to selectively abut opposing sides of the livestock's neck; and
   (c) exit gate interconnecting means for interconnecting said exit gate side portions such that said exit gate side portions synchronously pivot about said vertical axes.

4. The apparatus according to claim 3, including:
   (a) exit gate control means for controlling said synchronous pivoting of said exit gate side portions.

5. The apparatus according to claim 4, wherein:
   (a) said exit gate control means are hydraulically operated.

6. The apparatus according to claim 1, including:
   (a) noise reducing mounting means for mounting said lateral immobilizing means to said superstructure such that noise generation is minimized during use of said apparatus.

7. The apparatus according to claim 6, wherein:
   (a) said noise reducing mounting means include a plurality of mountings, each comprising:
       (1) a bracket;
       (2) a hub;
       (3) a mounting pin adapted to confine said hub to said bracket; and
       (4) a nylon sleeve imposed between said hub and said mounting pin.

8. The apparatus according to claim 1, wherein:
   (a) each of said opposing sidewalls includes a frame having a top rail, opposing side rails, and a generally horizontally oriented bottom rail; each of said bottom rails connected to said superstructure by stub axles such that each of said opposing sidewalls pivots about a respective, generally horizontal axis.

9. The apparatus according to claim 8, wherein:
   (a) said bottoms rails are spaced above said floor such that the user is protected from sidewise kicking by the animal as the animal is positioned in said chute and such that cleaning of said apparatus is facilitated.

10. The apparatus according to claim 8, including:
    (a) bottom rail spacing means for selectively, laterally spacing said bottom rails relative to each other.

11. The apparatus according to claim 10, wherein:
    (a) said bottom rail spacing means include a pair of cooperating fixing levers for each of said opposing sidewalls; each of said pair of fixing levers adapted to provide a plurality of axes for said pivoting of respective said sidewall.

12. The apparatus according to claim 10, including:
    (a) each of said sidewalls having a pair of downwardly depending sidewall extension;
    (b) a pair of slots for each of said sidewalls; each of said pair of slots adapted to slidably receive said sidewall extensions; and
    (c) a plurality of cams adapted to simultaneously displace said sidewalls toward and away from each other.

13. The apparatus according to claim 12, wherein:
    (a) said bottom rail spacing means are hydraulically operated.

14. The apparatus according to claim 8, wherein:
    (a) each of said opposing sidewalls includes lower access means for accessing lower portions of the animal as the animal is positioned in said chute; each said lower access means having a generally planar inner surface; each said lower access means connected to said bottom rail such that each pivots about a respective, generally horizontal axis; each of said lower access means having at least one latch adapted to selectively latch respective said lower access means in a closed configuration.

15. The apparatus according to claim 8, wherein:
    (a) each of said opposing sidewalls includes upper access means for accessing upper portions of the animal as the animal is positioned in said chute; each said upper access means having a plurality of generally vertically oriented bars; each said upper access means connected to respective said opposing side such that each pivots about a respective, generally horizontal axis; each of said upper access means having at least one latch adapted to selectively latch respective said upper access means in a closed configuration.

16. The apparatus according to claim 15, wherein:
(a) each of said upper access means has a plurality of sections along each side of the animal positioned in said chute.

17. The apparatus according to claim 8, including:
(a) sidewall interconnecting means for interconnecting said opposing sidewalls such that said opposing sidewalls synchronously pivot about respective said axes to selectively allow and prevent lateral movement of the animal as the animal is positioned in said chute.

18. The apparatus according to claim 17, including:
(a) sidewall control means for controlling said synchronous pivoting of said opposing sidewalls.

19. The apparatus according to claim 18, wherein:
(a) said sidewall control means are hydraulically operated.

20. The apparatus according to claim 1, wherein:
(a) said fore-and-aft immobilizing means include an entrance gate adapted to selectively prevent the animal positioned in said chute from exiting rearwardly from said chute.

21. The apparatus according to claim 20, wherein:
(a) said entrance gate includes two opposing entrance gate side portions, each connected to said superstructure such that each of said entrance gate side portions pivots about a respective, generally vertical axis.

22. The apparatus according to claim 21, including:
(a) entrance gate interconnecting means for interconnecting said entrance gate side portions such that said entrance gate side portions synchronously pivot about said respective, generally vertical axes.

23. The apparatus according to claim 22, including:
(a) entrance gate control means for controlling said synchronous pivoting of said entrance gate side portions.

24. The apparatus according to claim 23, wherein:
(a) said entrance gate control means are hydraulically operated.

25. The apparatus according to claim 1, including:
(a) weighing means for weighing the animal as the animal is positioned in said chute.

26. The apparatus according to claim 25, wherein:
(a) said weighing means includes:
   (1) an substructure; and
   (2) an electronic scale having transducers sandwiched between said substructure and said base.

27. A squeeze apparatus for a worker to restrain a large animal for treating and weighing, comprising:
(a) a chute including:
   (1) a base having an entrance end, an exit end, and a floor;
   (2) a superstructure rigidly secured to said base; and
   (3) opposing sidewalls, each having:
      (A) a frame adapted to be spaced above said floor such that the worker is protected from sidewise kicking by said animal as the animal is positioned in the chute and such that cleaning of said apparatus is facilitated;
      (B) a pair of opposing stub axles such that said sidewall is pivotable about a generally horizontal axis situated near lower extremities thereof;
      (c) a lower panel connected to said frame such that it is pivotable about a generally horizontal axis situated near lower extremities thereof; said lower panel adapted to provide access to lower extremities of the animal positioned in said chute; said lower panel having a substantially planar inner surface;
      (D) an upper panel connected to said frame such that it is pivotable about a generally horizontal axis situated near lower extremities thereof; said upper panel adapted to provide access to upper extremities of the animal positioned in the chute; said upper panel comprising a plurality of sections spaced side-by-side, with each section having a plurality of generally vertically oriented bars which are sufficiently spaced apart for the worker to reach therebetween; and
      (E) a plurality of latches adapted to latch said lower panel in a closed configuration and to latch each of said upper panel sections in a closed configuration;
(b) a pair of fixing levers for each said sidewall; each of said pair of fixing levers having a plurality of cooperating notches adapted to encircle said stub axles of respective said sidewall; each of said pair of fixing levers pivotally connected to said superstructure such that said notches selectively provide a plurality of pivoting axes for respective said sidewall;
(c) a squeezing mechanism adapted to synchronously pivot said opposing sidewalls inwardly and outwardly about respective said axes; said squeezing mechanism comprising:
   (1) a overhead bar generally oriented along the fore-and-aft centerline of said chute;
   (2) first and second elongate flanges rigidly secured to, and extending radially outwardly from, said bar;
   (3) a first pair of links, one pivotally connecting one end of said first elongate flange to an upper extremity of one of said sidewalls and the other pivotally connecting the other end of said first elongate flange to an upper extremity of the other one of said sidewalls;
   (4) a second pair of links similarly connecting said second elongate flange to said sidewalls;
   (5) a control flange rigidly secured to, and extending radially outwardly from, said bar; and
   (6) a hydraulically driven piston pivotally connected to said control flange and said superstructure;
(d) a neck clamping mechanism adapted to selectively clamp opposing sides of the neck of the animal positioned in said chute such that the animal cannot move backwardly in said chute; said neck clamping mechanism comprising:
   (1) a pair of opposing neck clamp side portions situated at said exit end of said chute;
   (2) a plurality of first noise reducing mountings adapted to mount said neck clamp side portions to said superstructure such that said neck clamp side portions are pivotable about respective, generally vertical axes and such that the neck of the animal positioned is said chute can extend between said neck clamp side portions as said neck clamp side portions are in a closed configuration; and (3) a neck clamp controlling mechanism for synchronously opening and closing said neck clamp side portions; said neck clamp controlling mechanism comprising:

(A) an overhead first cross arm pivotally connected to each of said neck clamp side portions; and (B) a hydraulically driven first piston pivotally connected to one of said neck clamp side portions and said superstructure;

(e) an entrance gate mechanism adapted to selectively prevent the animal positioned in said chute front backing out of said chute; said entrance gate mechanism comprising:

(1) a pair of opposing entrance gate side portions situated at said entrance end of said chute;

(2) a plurality of second noise reducing mountings adapted to mount said entrance gate side portions to said superstructure such that said entrance gate side portions are pivotable about respective, generally vertical axes; and (3) an entrance gate controlling mechanism for synchronously opening and closing said entrance gate side portions; said entrance gate controlling mechanism comprising:

(A) an overhead second cross arm pivotally connected to each of said entrance gate side portions; and (B) a hydraulically driven second piston pivotally connected to one of said entrance gate side portions and said superstructure;

(f) a substructure;

(g) an electronic scale adapted to weigh the animal positioned in said chute; said scale having a plurality of transducers sandwiched between said base and said substructure; and (h) a plurality of support spacers adapted to substantially remove the weight of said base and components supported thereby from said transducers as said apparatus is being transported and to allow the weight of said base and components supported thereby to bear against said transducers as the animal positioned in said chute is being weighed.

28. A method for at least one operator to work a large animal, comprising the steps of:

(a) providing a portable apparatus having:

(1) a chute having an entrance end, an exit end, opposite sidewalls, a base having a floor, and a superstructure;

(2) lateral immobilizing means for selectively immobilizing lateral movement of the animal as the animal is positioned in said chute;

(3) fore-and-aft immobilizing means for selectively immobilizing fore-and-aft movement of the animal as the animal is positioned in said chute;

(4) noise reducing mounting means for mounting said lateral immobilizing means and said fore-and-aft immobilizing means to said superstructure such that noise generation is minimized during use of said apparatus;

(5) exit gate means associated with said exit end, said exit gate means including said fore-and-aft immobilizing means for selectively immobilizing fore-and-aft movement of the animal relative to the apparatus; and (6) said exit gate means is pivoted intermediately between said exit end and said entrance end such that said exit gate closes generally transversely to said chute;

(b) driving the animal into said chute via said entrance end;

(c) immobilizing lateral and fore-and-aft movements of the animal by activating said lateral immobilizing means and said fore-and-aft immobilizing means;

(d) working the animal;

(e) releasing the animal via said exit end by deactivating said lateral immobilizing means and said fore-and-aft immobilizing means.

29. A livestock working apparatus, including:

(a) a chute having an entrance end, an exit end, opposing sidewalls, a base having a floor, and a superstructure;

(b) lateral immobilizing means for selectively immobilizing lateral movement of the livestock, said lateral immobilizing means associated with said opposing sidewalls;

(c) exit gate means associated with said exit end, said exit gate means including fore-and-aft immobilizing means for selectively immobilizing fore-and-aft movement of the animal relative to the apparatus;

(d) each of said opposing sidewalls includes a frame having a top rail, opposing side rails, and a generally horizontally oriented bottom rail; each of said bottom rails connected to said superstructure by stub axles such that each of said opposing sidewalls pivots about a respective generally horizontal axis;

(e) bottom rail spacing means for selectively, laterally spacing said bottom rails relative to each other;

(f) each of said sidewalls having a pair of downwardly depending sidewall extension;

(g) a pair of slots for each of said sidewalls; each of said pair of slots adapted to slidably receive said sidewall extensions; and (h) a plurality of cams adapted to simultaneously displace said sidewalls toward and away from each other.

30. A livestock working apparatus, including:

(a) a chute having an entrance end, an exit end, opposing sidewalls, a base having a floor, and a superstructure;

(b) lateral immobilizing means for selectively immobilizing lateral movement of the livestock, said lateral immobilizing means being associated with said opposing sidewalls;

(c) exit gate means associated with said exit end, said exit gate means including fore-and-aft immobilizing means for selectively immobilizing fore-and-aft movement of the animal relative to the apparatus; and (d) to said a noise suppression system connected to said lateral immobilizing means and comprising first and second mounting members movable with respect to each other and sleeve means interposed between said first and second mounting members and preventing contact therebetween as said first and second mounting members move with respect to each other.

31. The apparatus according to claim 30, wherein:

(a) said noise suppression system includes a plurality of gate hinge assemblies hingedly mounting said gate means on said superstructure, each said hinge assembly comprising:
(1) a bracket;
(2) a hub;
(3) a mounting pin adapted to confine said hub to said bracket; and
(4) a polymeric sleeve imposed between said hub and said mounting pin.

32. The apparatus according to claim 30 wherein said noise suppression system includes:
    (a) a plurality of stub axles associated with said lateral immobilizing means; and
    (b) a plurality of polymeric sleeves each receiving a respective stub axle.

33. The apparatus according to claim 30, which includes:
    (a) a drop panel located in said lateral immobilizing means and movable between open and closed positions;
    (b) panel hinge means including first and second mounting members rotatable with respect to each other; and
    (c) said noise suppression system including a polymeric sleeve positioned between said first and second mounting members.

34. The apparatus according to claim 30, which includes:
    (a) a drop panel associated with said lateral immobilizing means and movable between open and closed positions;
    (b) a latch for selectively retaining said panel in its closed position; and
    (c) said noise suppression system including a polymeric latch roller mounted on said panel and engaged by said latch with said panel in its closed position.

35. The apparatus according to claim 30, which includes:
    (a) a drop panel associated with said lateral immobilizing means and movable between open and closed positions;
    (b) a latch associated with said lateral immobilizing means and selectively retaining said drop panel in its closed position, said latch including a casing mounted on said lateral immobilizing means and a pinion reciprocably positioned within said casing; and
    (c) said noise suppression system comprising a polymeric sleeve positioned between said casing and said pinion.

36. The apparatus according to claim 35, which includes:
    (a) said casing and said pinion having upper ends; and
    (b) an elastomeric O-ring mounted on said pinion upper end and adapted to engage said casing with said latch in its closed position.

37. The apparatus according to claim 30, which includes:
    (a) said pinion having a lower end with a tapered configuration on an outboard side thereof;
    (b) a foot mounted on an inboard side of said pinion lower end; and
    (c) a polymeric latch roller mounted on an upper edge of said drop panel and adapted for engaging said pinion lower end outboard side as said drop panel is closed and further adapted for engaging said foot with said drop panel in its closed position.

38. The apparatus according to claim 30, which includes:
    (a) said lateral immobilizing means comprising a pair of opposed sidewalls each hingedly connected to said superstructure by respective sidewall hinge means;
    (b) said exit gate means being pivotally connected to said superstructure by a plurality of gate hinge means;
    (c) a rod having opposite ends each rotatably connected to said superstructure generally above a level of said sidewall;
    (d) a flange and linkage mechanism connected to said rod and to said sidewalls for moving said sidewalls towards and away from each other;
    (e) each said sidewall having a drop panel hingedly connected to said sidewall and movable between open and closed positions;
    (f) a plurality of latches each associated with a respective drop panel for securing same in its closed position; and
    (g) said noise suppression system comprising polymeric sleeves located at said sidewall hinge means, said gate hinge means, said rod rotatable connections, said drop panel hinged connections and said latches for separating relatively movable components thereof.

39. The apparatus according to claim 30, wherein:
    (a) said exit gate means is pivoted intermediately between said exit end and said entrance end such that said exit gate closes generally transversely to said chute.

* * * * *